(No Model.)
H. L. PALMER.
SERVING TRAY.
No. 515,161. Patented Feb. 20, 1894.
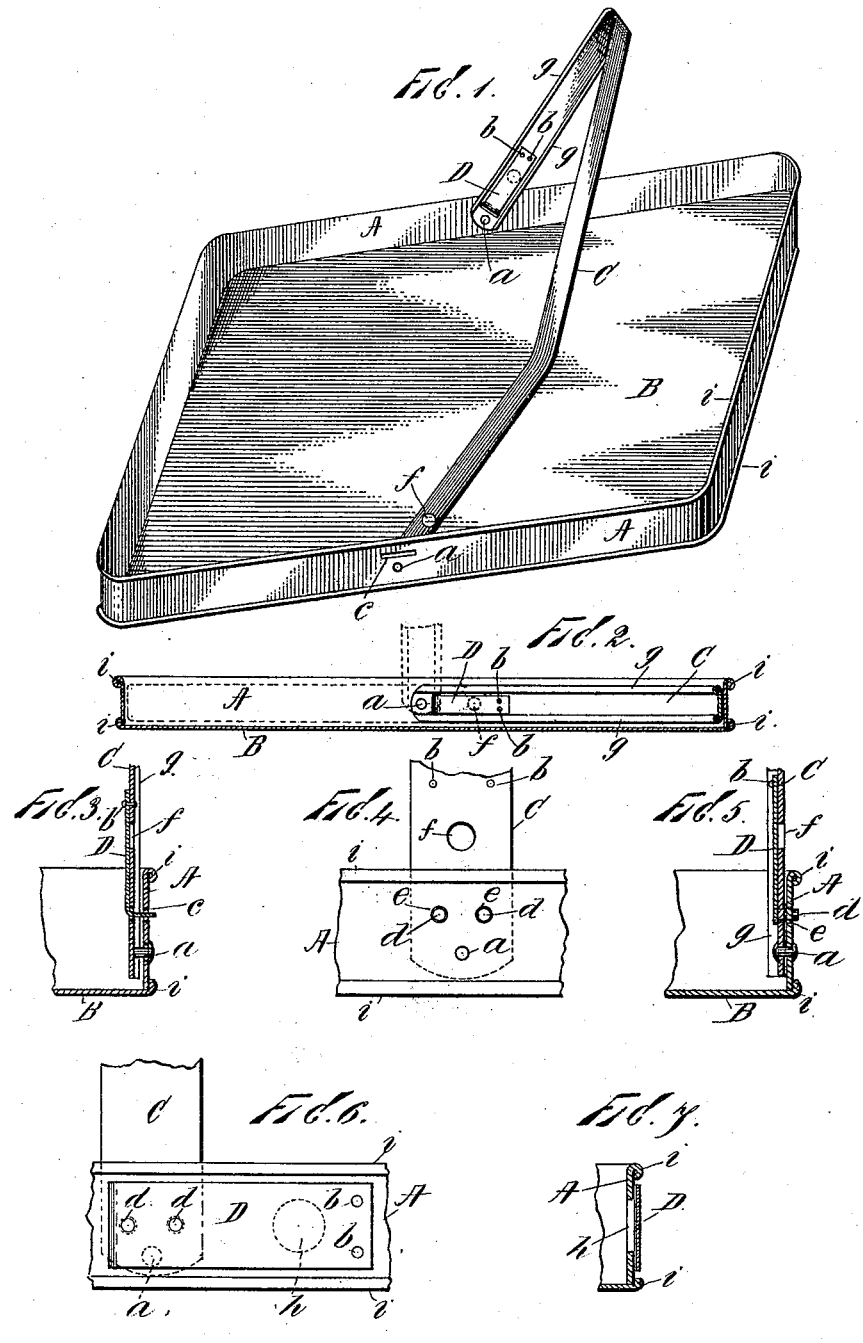

UNITED STATES PATENT OFFICE.

HENRY L. PALMER, OF BROOKLYN, NEW YORK.

SERVING-TRAY.

SPECIFICATION forming part of Letters Patent No. 515,161, dated February 20, 1894.

Application filed December 18, 1893. Serial No. 493,959. (No model.)

*To all whom it may concern:*

Be it known that I, HENRY L. PALMER, of Brooklyn, county of Kings, and State of New York, have invented certain new and useful Improvements in Serving-Trays, of which the following is a full, clear, and exact description, reference being had to the accompanying drawings, and to the letters of reference marked thereon.

My invention relates to that class of devices known as serving trays and employed for carrying or serving various articles.

The principal object of my invention is to provide a tray of the class named with a convenient and serviceable handle, arranged so that it may, when required, be turned down compactly against the end wall and bottom of the tray on either side of the hinge axis or pivot, and to combine with the said handle and tray an efficient and conveniently operating spring whereby to lock the handle firmly in its elevated position and prevent movement thereof with respect to the tray.

A subordinate object is to so locate and arrange the safety locking spring that it will be protected against damage or disarrangement and not diminish the capacity of the tray or project beyond its limits.

To accomplish all of this and to secure other advantages in construction and operation, my improvements involve certain new and useful arrangements or combinations of parts and peculiarities of construction as will be herein first fully described and then pointed out in the claims.

In the drawings, Figure 1 is a perspective view showing a hand tray with my improvements applied, the handle being represented in a position intermediate of its raised and lowered positions. Fig. 2 is a sectional view of the tray showing the handle turned down against the bottom on the end, other positions of the handle being indicated in dotted lines. Fig. 3 is a sectional view through a part of the handle and one side of the tray showing the locking spring applied upon the handle. Fig. 4 is a side view of a fragment of the tray and handle illustrating the application of two locking points on the spring, and Fig. 5 is a sectional elevation corresponding with Fig. 4. Fig. 6 is a side view of a fragment of the tray and handle showing the spring lo- cated on the wall of the tray instead of on the handle as in previous figures. Fig. 7 is a cross section of the wall of the tray with spring attached, showing the finger opening through which the spring is released when required.

In all the figures like letters of reference, wherever they occur, indicate corresponding parts.

A. A. are the walls of the tray which may be of any desired dimensions, and B the bottom thereof.

C is a handle pivoted to the walls A at opposite points, and against the inner faces, as by bolts or rivets *a* which operate as hinge axes and on which the handle may be turned or swung. The handle C is made of size and shape so that when turned down in either direction, as in Fig. 2 it will fit snugly against the adjacent walls of the tray in order to occupy as little of the tray room as possible. When in this position the tray may be employed for serving refreshments, &c., with the same convenience and facilities as any tray without a handle.

All the articles which are to be served must of course be first carried, but the tray is frequently loaded with receptacles too full to be carried without danger of spilling or slopping their contents, and sometimes with tall receptacles such as tea pots, liable to be toppled over. The application of the handle renders it safe to carry any or all these articles upon the tray, but without some means of locking the handle in position for use, the carrying is not always convenient, for if the tray be loaded on one side more than the other, both hands are required to prevent it from tipping or swinging. I therefore supply a safety locking spring D to operate in conjunction with the tray and its hinged handle. This spring as shown in Figs. 1 to 5 is applied upon and moves with the handle C, one end of the spring being fixed, by solder or as by rivets *b b*, the other end, or some attachment thereon projecting through the handle and arranged to enter a perforation provided for it in the tray wall. The end of the flat spring D may be bent as shown in Fig. 3, in which case it will enter a narrow slot as *c* provided for it in wall A, as soon as the handle is raised to the proper point. In Figs. 4 and 5, the spring, instead of being bent at the end, is intended to be supplied with suitable projections or studs $d$, which when in locking position enter corresponding perforations $e$ in the tray wall, serving the same purposes as the bent end. In either form, it will be observed that the locking projections have an extensive bearing on each side of the hinge axis, the object of which is to obviate movement of the handle with respect to the tray, when locked, insuring rigid connection of the two parts at this time. When upon the handle, the spring is located upon the inside thereof, and the handle provided with a finger opening as $f$ through which the spring may be conveniently reached and pressed back out of its locking position and thus the handle released.

The handle is provided with marginal beads or stiffening wires as at $g\ g$, and the spring D is located between these, so that it is effectually protected against contact by any articles in or on the tray and against disarrangement thereby, and in this position it does not add to the room or space required for the handle. If the handle be very strong and stiff, one spring for safely locking it might suffice, but it is preferred to supply each handle with two of the springs similarly arranged. Like advantages and effects can be secured by locating the locking springs on the tray walls, as indicated in Figs. 6 and 7, the handle and walls being suitably perforated to permit the passage of the holding projections of whatever form they may be. Under this arrangement, the wall of the tray is perforated as at $h$ to admit the finger to release the locking spring, the spring being located on the exterior, and protected by the marginal beadings $i\ i$ with which the wall is provided at top and bottom. The handle being released, may be turned down within the tray, and whenever required may be instantly turned up, the springs operating automatically to engage the side walls or handle as soon as it reaches the proper point.

The device constructed substantially in accordance with the foregoing explanations is found to answer all the purposes or objects of the invention previously alluded to.

Having now fully described my invention, what I claim as new herein, and desire to secure by Letters Patent, is—

1. In a tray of the character herein set forth, the handle hinged or pivoted on the walls at opposite sides and arranged to be turned down within the tray, and a locking spring operating to rigidly maintain the handle when in upright position, the wall of the tray being arranged to engage with and hold the spring the parts being combined and arranged substantially as shown and described.

2. In a tray of the character herein set forth, the hinged handle and a locking spring therefor, said spring being located between and protected by the marginal beadings or stiffening wires, and the wall of the tray being arranged to engage with and hold the spring the parts being combined and arranged substantially as shown and described.

3. In a tray of the character herein set forth, the combination with the hinged handle, of the locking spring provided with a projection passing through the handle and arranged to enter a perforation for it in the tray wall, the said handle being provided with a finger opening through which the spring may be pressed back, substantially as and for the purposes explained.

In testimony that I claim the foregoing I have hereunto set my hand in the presence of two witnesses.

HENRY L. PALMER.

Witnesses:
W. J. MORGAN,
WORTH OSGOOD.